(12) United States Patent
Hebenstreit et al.

(10) Patent No.: US 7,757,569 B2
(45) Date of Patent: Jul. 20, 2010

(54) COLUMN TUBE SWITCH MODULE

(75) Inventors: Axel Hebenstreit, Stuttgart (DE); Hans-Dieter Loeffler, Reutlingen (DE); Markus Mauch, Aichwald (DE)

(73) Assignee: Daimler AG, Stuttgart (DE)

( * ) Notice: Subject to any disclaimer, the term of this patent is extended or adjusted under 35 U.S.C. 154(b) by 110 days.

(21) Appl. No.: 12/064,520

(22) PCT Filed: Aug. 2, 2006

(86) PCT No.: PCT/EP2006/007642

§ 371 (c)(1), (2), (4) Date: Jun. 23, 2008

(87) PCT Pub. No.: WO2007/022857

PCT Pub. Date: Mar. 1, 2007

(65) Prior Publication Data

US 2009/0183588 A1    Jul. 23, 2009

(30) Foreign Application Priority Data

Aug. 25, 2005  (DE) .................. 10 2005 040 141

(51) Int. Cl.
G01L 3/00    (2006.01)
(52) U.S. Cl. .................................. 73/862.08
(58) Field of Classification Search ................ 73/862.08–862.324
See application file for complete search history.

(56) References Cited

U.S. PATENT DOCUMENTS

| | | | | |
|---|---|---|---|---|
| 4,683,375 A * | 7/1987 | Hoshino et al. | ........ | 250/231.14 |
| 4,938,094 A * | 7/1990 | Cochard | ........ | 74/552 |
| 5,944,534 A * | 8/1999 | Hoffmann et al. | ........ | 439/15 |
| 6,892,602 B2 * | 5/2005 | Hirschfeld et al. | ........ | 74/484 R |
| 7,239,972 B2 * | 7/2007 | Deville | ........ | 702/94 |
| 2007/0039402 A1 | 2/2007 | Hebenstreit et al. | | |

FOREIGN PATENT DOCUMENTS

| | | |
|---|---|---|
| DE | 199 42 818 A1 | 3/2001 |
| DE | 102 59 167 B3 | 5/2004 |
| EP | 1 069 025 A2 | 1/2001 |
| EP | 1 526 059 A2 | 4/2005 |

OTHER PUBLICATIONS

International Search Report dated Nov. 2, 2006 and an English translation of the pertinent portion (12 pages).

* cited by examiner

*Primary Examiner*—Max Noori
(74) *Attorney, Agent, or Firm*—Crowell & Moring LLP

(57) ABSTRACT

A column tube switch module is radially and axially fixed to a column tube and is supported at the same time on a bearing arranged on the steering spindle. A centering device secures a stator radially to the column tube when a force is acting coaxially on the longitudinal axis of the steering spindle. A steering angle sensor is provided whose fixed part is connected to the stator-end bearing while its rotating part is held so as to be capable of being driven by the steering wheel hub.

3 Claims, 3 Drawing Sheets

COLUMN TUBE SWITCH MODULE

BACKGROUND AND SUMMARY OF THE INVENTION

This application is a national stage of PCT International Application No. PCT/EP2006/007642, filed Aug. 2, 2006, which claims priority under 35 U.S.C. §119 to German Patent Application No. 10 2005 040 141.4, filed Aug. 25, 2005, the disclosures of which are expressly incorporated by reference herein.

The invention relates to a column tube switch module and to a steering column arrangement having a column tube switch module.

Column tube switch modules are modules which are arranged on a column tube of a steering spindle in a motor vehicle. These modules are configured in such a way that they are fitted, for example, with steering column switches for flashing indicator lights.

The column tube switch module is generally attached to the steering spindle and arranged concentrically with respect to the column tube of the steering spindle. A centering device such as is described in DE 102 59 167 A1 can be provided for attaching such a column tube switch module to the spindle.

The DE 102 59 167 A1 centering device is equipped with a bearing that supports the column tube switch module being on the steering spindle. During the mounting process, a force directed coaxially to the longitudinal axis of the steering spindle moves the column tube switch module in the axial direction as far as an end position and automatically centered in the radial direction, for example a force acting on a steering wheel hub by means of a steering wheel screw. It is advantageous here that just one method step, specifically the application of a coaxially acting force, is sufficient to attach the switch module to the column tube. At the same time, the application of the axial force causes the switch module to be pulled against the steering wheel so that it is not possible for any axial movement to take place between the switch module and the steering wheel. In addition, rotation or tilting of the switch module can be virtually ruled out. This advantage also makes it possible, inter alia, to carry out fault free mounting of a steering angle sensor integrated into the switch module.

For a wide variety of driver assistance systems it is necessary to use high-resolution steering angle sensors. However, high-resolution steering angle sensors only supply data which can be used and evaluated if the tolerances between the steering wheel and steering column are kept sufficiently small. In conventional fabrication and mounting solutions, such as described, for example, in DE 199 33 049 A1, it is proposed to shorten the axial tolerance chain by positioning the rotating part of the steering angle sensor, here the code disc, closer to the bearing of the steering column in the column tube.

The disadvantage of this solution is the large number of parts which are able to be mounted in the actual vehicle so that propagation of a module is prevented. Furthermore, the stator which is not centered permits a comparatively large number of tolerances compared to the steering column and steering wheel. The tolerances result from the free bearing of the steering wheel sensor system in the module and the indirect driving of the steering angle sensor rotor.

The object of the invention is accordingly to make available a column tube switch module which can be manufactured cost-effectively, while at the same time making available a high-resolution steering angle sensor.

The column tube switch module has, for the purpose of minimizing the axial and radial tolerance chain, a stator which is secured radially to the column tube by a centering device when there is a force acting coaxially with respect to the steering column. A preferably high-resolution steering angle sensor is supported on this radially secured stator. The rotating part is deflected in accordance with the deflection of the steering wheel hub by means of a driver moving the steering wheel hub. As a result of the combination of the attachment of the steering wheel sensor to the stator of the column tube switch module and the driver, the components of the steering system are prevented from influencing the accuracy of the steering angle sensor. The distance between the column tube and the end of the steering spindle can be increased by virtue of the inventive attachment of the steering angle sensor to the stator without adversely affecting the axial tolerance chain.

Other objects, advantages and novel features of the present invention will become apparent from the following detailed description of the invention when considered in conjunction with the accompanying diagrams.

DETAILED DESCRIPTION OF THE DRAWINGS

Figure 1:
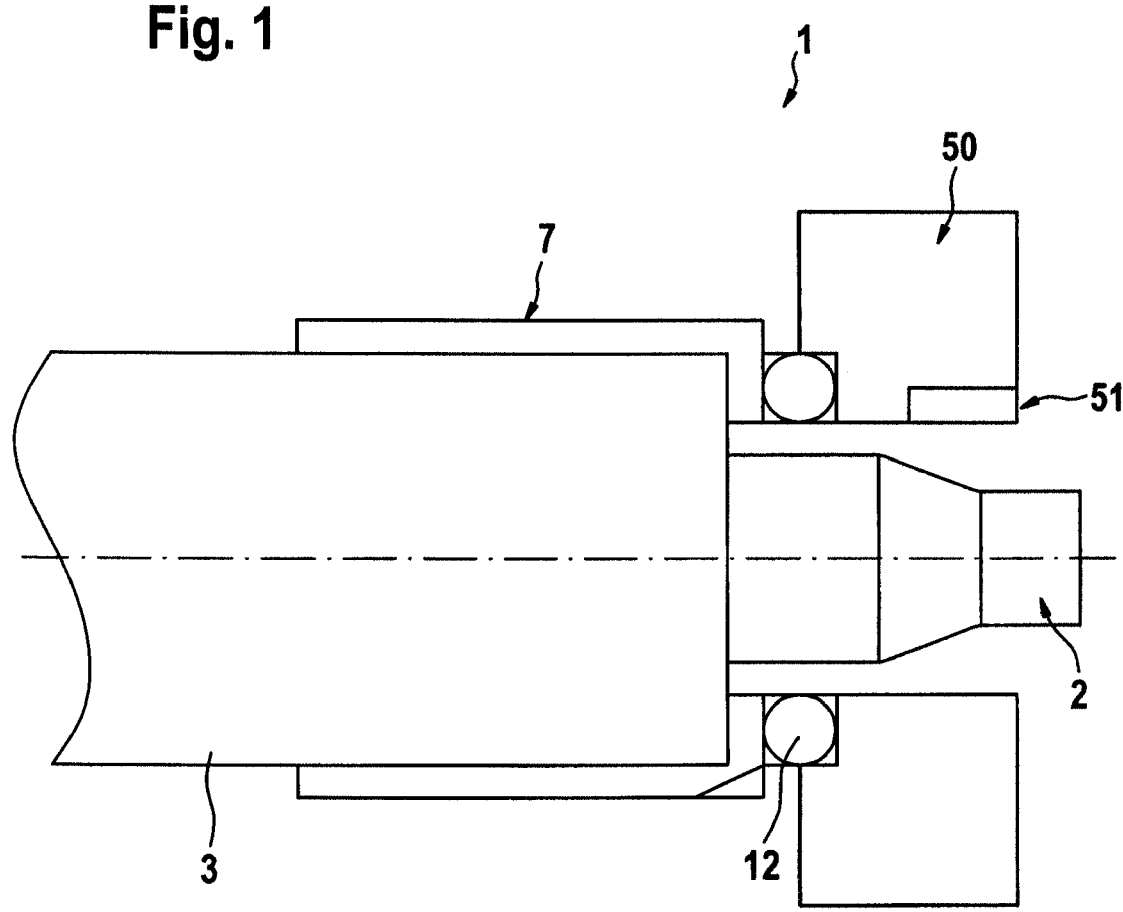
FIG. 1 shows a schematic illustration of a column tube switch module with steering angle sensor.
Figure 2:
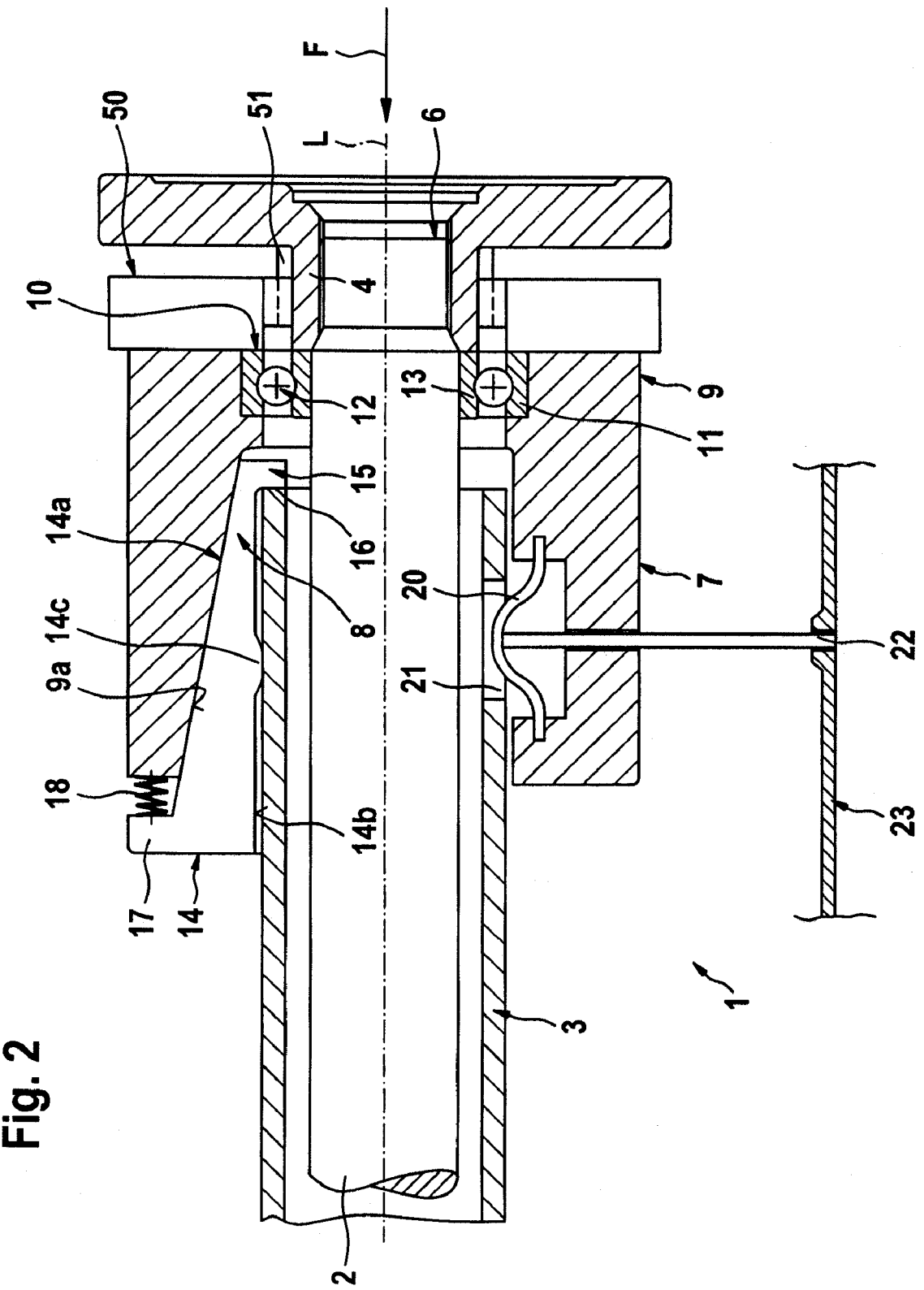
FIG. 2 shows a sectional illustration of a column tube switch module with steering angle sensor.
Figure 3A:
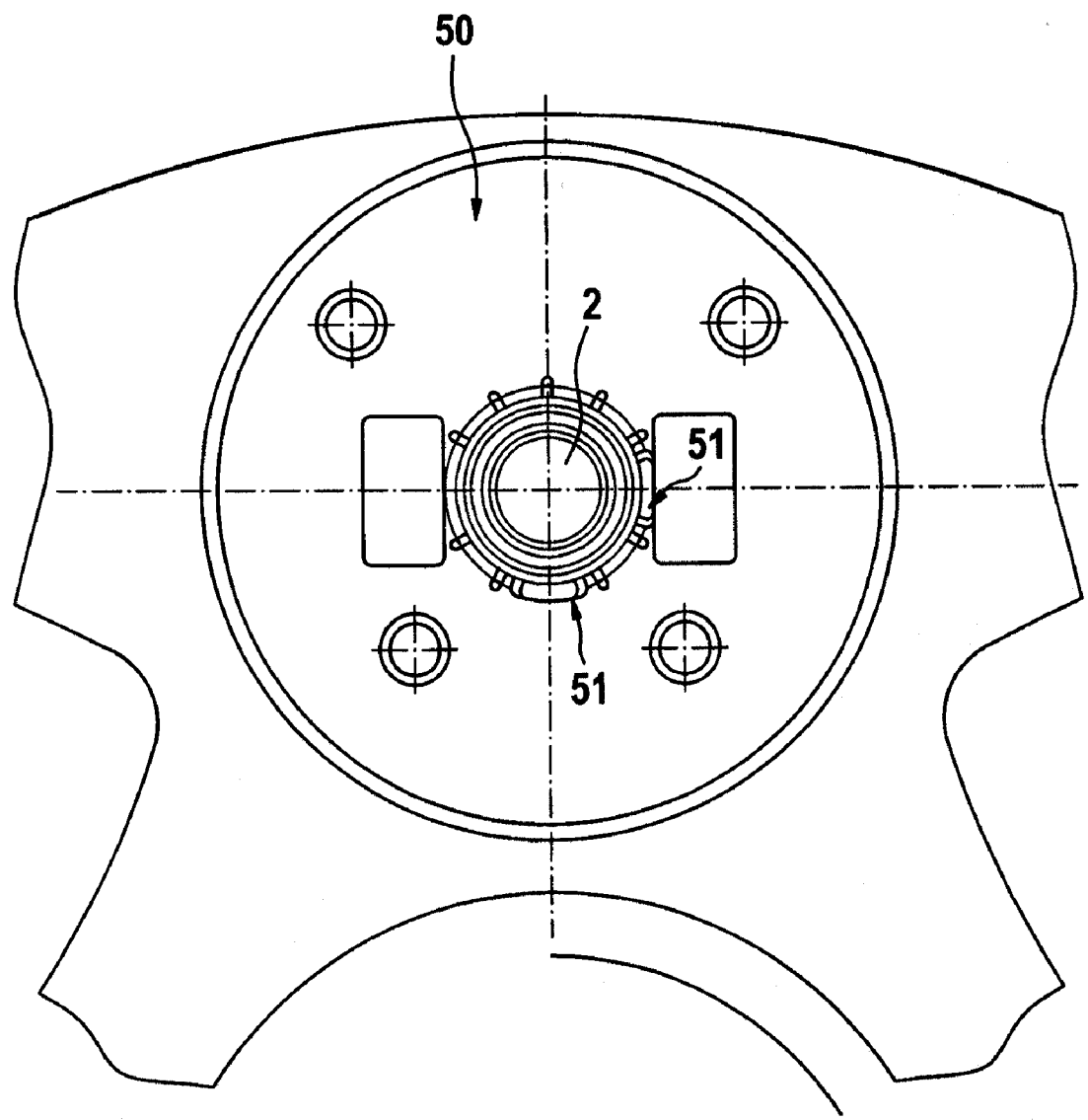
FIG. 3 shows a plan view a) and a side view b) of a steering wheel hub.
Figure 3B:
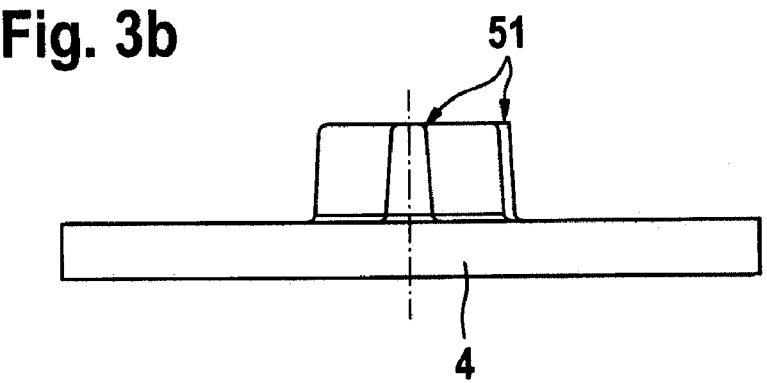

A steering column arrangement 1 with a steering spindle 2 and an internal column tube 3 arranged coaxially with respect to the steering spindle 2 are illustrated in a longitudinal section in FIGS. 1 and 2. For a comfort adjustment of a steering wheel, of which just a steering wheel hub 4 is illustrated here, it is possible to provide an external column tube (not illustrated here in more detail), and the external column tube is mounted here so as to be moveable relative to the internal column tube 3.

The steering wheel hub 4 is plugged onto that end 6 of the steering spindle 2 which faces the passenger compartment of the vehicle, and is plugged on coaxially with respect to the steering spindle 2. The end 6 of the steering spindle 2 has a straight outer toothing which engages in a corresponding inner toothing of the steering wheel hub 4 so that a rotational movement of the steering wheel can be transmitted to the steering spindle 2.

A switch module 7 is attached to the internal column tube 3. The switch module 7 serves, for example, for the mounting of switch levers. It is necessary for this purpose for the switch module 7 to be secured immovably with respect to the rotational movement of the steering wheel 4 and/or of the steering spindle 2.

The switch module 7 is illustrated in FIGS. 1 and 2 with its centering device 8. The centering device 8 comprises a stator 9 which is embodied as a hollow cylinder and whose internal diameter is matched to the external diameter of the internal column tube 3.

An external ring 11 of an axial bearing 12 is attached at that end 10 of the centering device 8 which points toward the steering wheel hub 4. The axial bearing 12 is supported with its internal ring 13 on the steering spindle 2 so that when the steering spindle 2 rotates the stator 9 remains immobile.

The stator 9 has clamping jaws 14 distributed over the circumference of the column tube 3 which bear with an angular support 15 on the front and side 16 of the column tube 3. The clamping jaws 14 are mounted with one end 17 on the stator 9 by means of spring elements 18. The spring elements are arranged in such a way that when an axial force acts in accordance with arrow F on the stator 9 by means of the spring elements 18 in the stator 9 the force F is applied to the clamping jaws 14. The angular support 15 causes the clamping jaws 14 to be pulled on uniformly over the circumference of the column tube 3 so that all the clamping jaws 14 are centered over the circumference of the column tube 3.

The surface 14a of the clamping jaw 14 which faces the stator, 9 extends obliquely with respect to the longitudinal axis L of the steering spindle 2. The stator 9 which moves in the opposite direction to the clamping jaw 14 causes the clamping jaw 14 to bear against the column tube 3. This effect is amplified if the internal face 9a of the stator 9 extends parallel to the oblique face 14a of the clamping jaw 14. An elevation 14c is provided at the face 14b, which faces the column tube 3. The stator 9 is driven forward in accordance with the direction F of the arrow. The elevation 14c is pressed against the column tube 3 by the abutment of the oblique faces 9a and 14a and as a result brings about automatic centering of the entire switch module 7.

A spiral spring 20 is attached to the inner wall 19 of the stator 9 to secure the switch module 7 tangentially. A recess 21 is provided in the column tube 3.

The central region of the spiral spring 20 is concave to automatically center it in the recess 21 so that no tolerances are permitted in the radial rotation of the switch module 7. Given corresponding pre-stressing of the spiral spring 20, the spring always passes through the recess until it comes to bear with its sides against the edges of the recess 21.

A check pin 22 guided in a lining 23 of the steering column arrangement 1 is attached to the underside of the spiral spring 20. Depending on the position of the spiral spring 20, the check pin 22 projects through the lining 23 or terminates flush with the lining 23 so that the correct position of the spiral spring 20 in the recess 23 can be determined by checking haptically.

A steering angle sensor 50 is arranged between the steering wheel hub 4 and the stator 9. The steering angle sensor 50 is connected directly by its fixed part to the fixed external ring 11 of the bearing 12. The rotating part of the steering angle sensor 50 is driven by a driving web 51 integrally molded onto the steering wheel hub 4. The direct connection of the integrally molded driving web 51 to the steering wheel hub 4 permits the steering angle sensor 50 to be driven without play. The bearing of the steering angle sensor on the 12 stator can be based for example, on an optical or inductive principle, 9 and results in a minimum tolerance chain. The bearing 12 is secured by the steering wheel hub 4. High-resolution steering angle sensors can therefore be implemented in the column tube switch module.

A second driving web 51 is necessary for decoupling further systems, for example the resetting means for the flashing indicator lights. Systems internal to the module do not have any influence on the accuracy of the steering angle sensor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An apparatus comprising:
    a column tube switch module radially and axially fixed to a column tube, supported on a stator-end bearing of a steering spindle;
    a centering device for securing a stator radially to the column tube when a force acts coaxially with respect to a longitudinal axis of the steering spindle; and
    a steering angle sensor connected to the stator-end bearing, wherein the steering angle sensor comprises a fixed part connected to the stator-end bearing and a rotation part connected to the steering wheel hub.

2. The apparatus according to claim 1, wherein the steering wheel hub can operate the rotating part.

3. The apparatus according to claim 1, wherein a driver can operate the steering wheel hub.

* * * * *